(12) United States Patent
Rapoport

(10) Patent No.: US 10,935,669 B2
(45) Date of Patent: Mar. 2, 2021

(54) USING SDP RELAXATION FOR OPTIMIZATION OF THE SATELLITES SET CHOSEN FOR POSITIONING

(71) Applicant: Topcon Positioning Systems, Inc., Livermore, CA (US)

(72) Inventor: Lev Borisovich Rapoport, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 400 days.

(21) Appl. No.: 16/088,581

(22) PCT Filed: Apr. 18, 2018

(86) PCT No.: PCT/RU2018/000239
§ 371 (c)(1),
(2) Date: Sep. 26, 2018

(87) PCT Pub. No.: WO2019/203677
PCT Pub. Date: Oct. 24, 2019

(65) Prior Publication Data
US 2021/0011174 A1    Jan. 14, 2021

(51) Int. Cl.
*G01S 19/44* (2010.01)
*G01S 19/42* (2010.01)
*G01S 19/55* (2010.01)

(52) U.S. Cl.
CPC ............ *G01S 19/44* (2013.01); *G01S 19/425* (2013.01); *G01S 19/55* (2013.01)

(58) Field of Classification Search
CPC ........................ G01S 19/425; G01S 19/53–55
See application file for complete search history.

(56) References Cited

U.S. PATENT DOCUMENTS

| 5,914,685 A | 6/1999 | Kozlov et al. |
| 2009/0184869 A1 | 7/2009 | Talbot et al. |

(Continued)

FOREIGN PATENT DOCUMENTS

WO    2017066915 A1    4/2017

OTHER PUBLICATIONS

Y. Kim et al., Quadratically Constrained Attitude Control via Semidefinite Programming, IEEE Transactions on Automatic Control, vol. 49(5), p. 731-735, May 2004 (Year: 2004).*

(Continued)

*Primary Examiner* — Bernarr E Gregory
*Assistant Examiner* — Fred H Mull
(74) *Attorney, Agent, or Firm* — Bardmesser Law Group

(57) ABSTRACT

A method for determining attitude of an object having multiple GNSS antennas, the method including receiving GNSS signals from at least five satellites, wherein at least 2 of the five belong to a different satellite constellation than the other satellites; processing each of the GNSS signals to generate pseudorange code and carrier phase measurements; resolving carrier phase ambiguities for all the received GNSS signals; generating unbiased carrier phase measurements based on the resolving; determining the attitude, including heading, pitch, and roll angles $\psi,\theta,\phi$, respectively, by solving a quadratically constrained quadratic minimization problem through finding a minimum of a linear function subject to a linear matrix inequality constraint; and outputting the attitude.

11 Claims, 4 Drawing Sheets

(56) References Cited

U.S. PATENT DOCUMENTS

2012/0139784 A1   6/2012  Ashjaee et al.
2017/0219717 A1*  8/2017  Nallampatti Ekambaram ............
                                                    G01S 19/53

OTHER PUBLICATIONS

S. Ahmed et al., A Semidefinite Relaxation-Based Algorithm for Robust Attitude Estimation, IEEE Transactions on Signal Processing, vol. 60(8), p. 3942-3952, Aug. 2012 (Year: 2012).*
Search Report in PCT/RU2018/000239, dated Jan. 17, 2019.

* cited by examiner

USING SDP RELAXATION FOR OPTIMIZATION OF THE SATELLITES SET CHOSEN FOR POSITIONING

BACKGROUND OF THE INVENTION

Field of the Invention

The present invention relates to a satellite navigation systems, and, more particularly, to determination orientation of the rigid body using multiple navigation antennas fixed on it.

Description of the Related Art

Assume that we have multiple antennas fixed on the rigid non-deformable non-elastic body. The problem to be solved is determination of the orientation of the body relative to the certain reference frame fixed on Earth. More precisely, of interest is determination of the angular orientation of the body frame connected to the body with respect to the local horizon frame connected to the Earth as shown in the FIG. 1. This problem may be referred to as the "attitude determination problem". Here, the word "attitude" means angular orientation (see [1]). There is a third reference frame called ECEF (Earth centered Earth fixed) frame. The GNSS positioning allows for determination of position with respect to ECEF. There are relationships converting orientation of the body frame relative to ECEF to the orientation of the body frame relative to the local horizon. Orientation can be determined in three ways:
1) Three Euler angles, Heading, Pitch, Roll;
2) Orthogonal matrix;
3) Quaternion vector All three approaches are, basically, equivalent. Connection between Euler angles and orthogonal matrix rotating from the local horizon to the body frame is described by the following equation, where $\psi,\theta,\phi$ stands for heading, pitch, and roll angles respectively and Q stands for orthogonal matrix $$Q = \begin{pmatrix} \cos(\psi)\cos(\theta) & \cos(\psi)\sin(\phi)\sin(\theta) - \cos(\phi)\sin(\psi) & \sin(\phi)\sin(\psi) + \cos(\phi)\cos(\psi)\sin(\theta) \\ \cos(\theta)\sin(\psi) & \cos(\phi)\cos(\psi) + \sin(\phi)\sin(\psi)\sin(\theta) & \cos(\phi)\sin(\psi)\sin(\theta) - \cos(\psi)\sin(\phi) \\ -\sin(\theta) & \cos(\theta)\sin(\phi) & \cos(\phi)\cos(\theta) \end{pmatrix}. \qquad (1)$$

Figure 1:
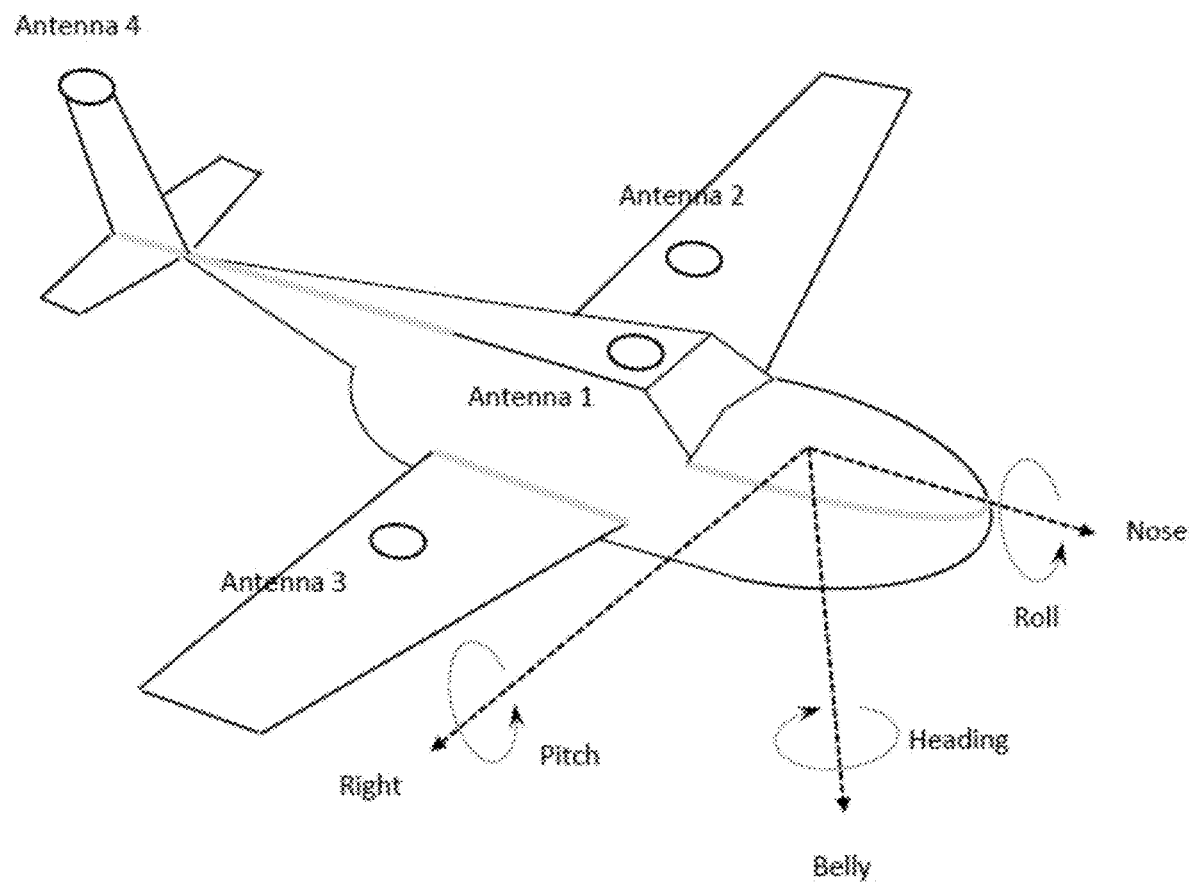
Figure 1:
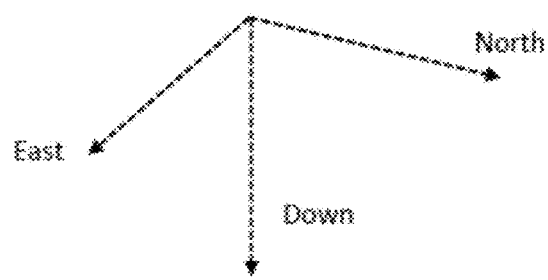

Definition of angles and their positive direction are shown in FIG. 1. Positive direction of each angle is counter-clockwise when looking at the pointed side of the corresponding arrow.

Exemplary location of antennas on the body is shown in FIG. 1 where one antenna is located on the cockpit roof, two antennas on wings, and another one is on the top of tail. Generally, the overall number of antennas should be at least 3. Let N be number of antennas. Requirements for antennas location will be discussed further below.

Antennas can be considered as vertices of the graph. Connecting each vertex with every other vertex we obtain the full connected non-oriented graph shown in the FIG. 2. The total number of edges in the graph is $$\frac{N(N-1)}{2}.$$

Figure 3:
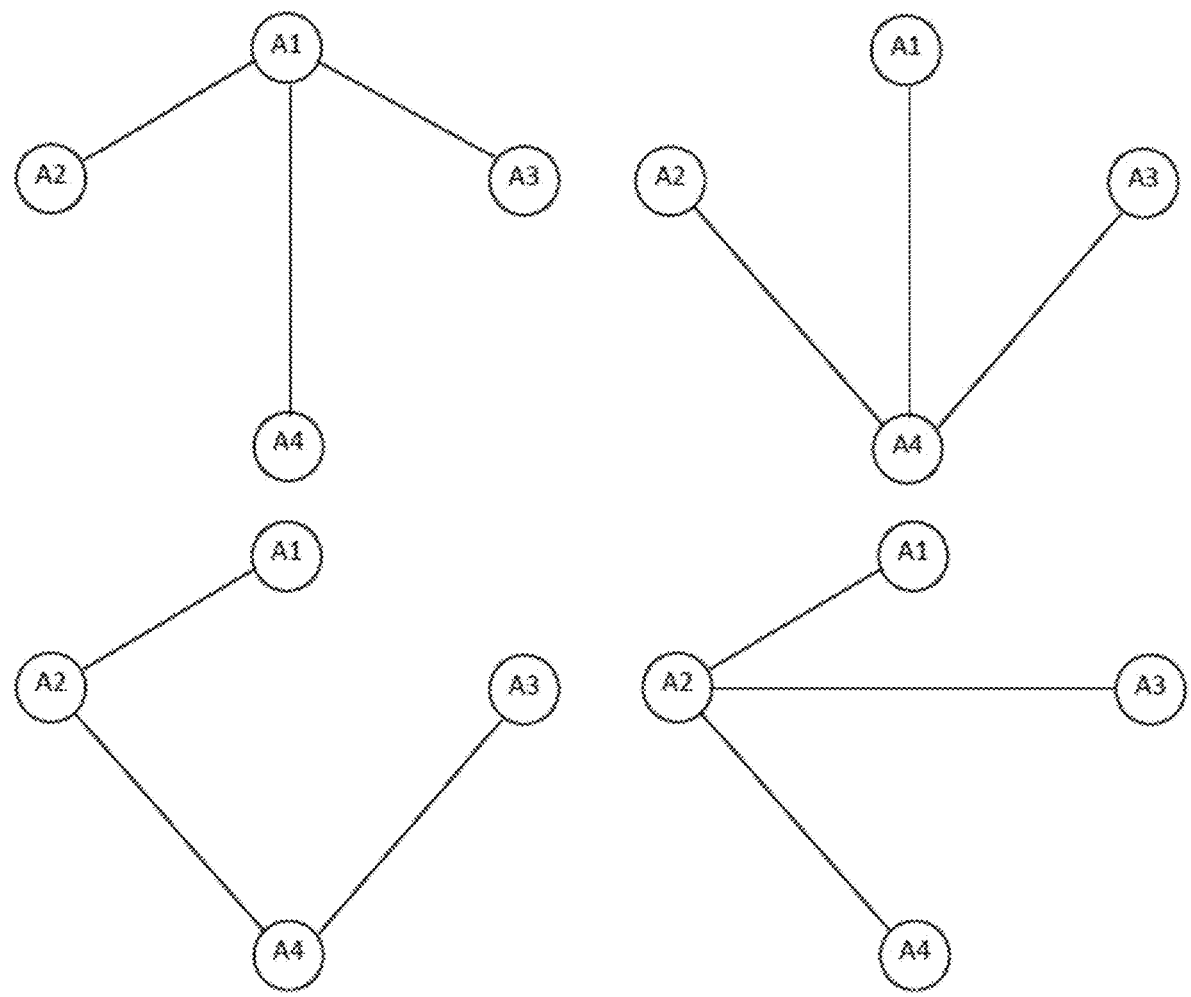

Let us choose one of possible spanning tree in the graph. The choice of the spanning tree will be discussed further below. Generally speaking, each spanning tree provides certain precision of the attitude calculations. The idea behind the optimization of the spanning tree choice is getting the "best geometry" in terms of attitude precision quality. Different examples of the spanning tree are shown in FIG. 3. The number of edges in each possible spanning tree is N−1.

Each edge of the spanning tree is denoted by (k,l), with k and l being vertices or, in other words, indices representing, for brevity, antennas $A_k$ and $A_l$ respectively. Since the graph is non-oriented, the order of indices does not matter. However, keeping in mind carrier phase differential (CPD) processing of GNSS measurements, the indices order implies the way the across-receiver differences (described below) are formed. Namely, (k,l) means that a certain observable measured by the antenna $A_l$ is subtracted from the measurement measured by the antenna $A_k$. Below is short description of the GNSS observables used for attitude determination.

Assume that the receiver connected to each antenna, or a multi-antenna receiver connected to plurality of antennas, is capable of receiving multiple GNSS signals of multiple GNSS satellites, including (but not limited to) the following set:

GPS L1, L2, L5;

Galileo L1, L2, E5a, E5b;

QZSS L1, L2, L5, E6;

GLONASS L1, L2, L3;

BEIDOU B1, B2, B3.

The number of such signals can exceed several dozen. The following fundamental set of observables is used:

$$P_{k,b}^s(t) = \rho_k^s(t) + cdt_k(t) - cdt^s(t) + \qquad (2)$$
$$\left(\frac{f_{L1}^s}{f_b^s}\right)^2 I_{k,L1}^s(t) + T_k^s(t) + d_{k,b,P} + M_{k,b,P}^s - D_{b,P}^s + \varepsilon_{k,b,P}^s(t)$$

$$\phi_{k,b}^s(t) = \frac{f_b^s}{c}\rho_k^s(t) + f_b^s dt_k(t) - f_b^s dt^s(t) + N_{k,b}^s(t_{CS,k,b}^s) - \qquad (3)$$
$$\frac{1}{c}\frac{(f_{L1}^s)^2}{f_b^s}I_{k,L1}^s(t) + \frac{f_b^s}{c}T_k^s(t) + d_{k,b,\varphi}^s + M_{k,b,\varphi}^s - D_{b,\varphi}^s + \varepsilon_{k,b,\varphi}^s,$$

where the following notations are used (see [1, Chapter 6, 7]):
k is the index of the antenna, k=1, . . . , N;
s is the number of the satellite (out of S total satellites from which signals are received). It is assumed that all satellites available for tracking by the antenna k are ordered and this ordering number includes the satellite system. For example, satellites with numbers from 1 to 32 are GPS, satellites with numbers from 33 to 56 are GLONASS, satellites with numbers from 57 to 88 are BEIDOU, etc.;

b is the frequency band (for example L1, LP2, L2C, L5, E6, B1, and so on);

$\{s,b\}$ the pair of indices indicating the signal of the satellite s at the frequency band b;

t is the current time; the term "epoch" is also used to denote the current discrete time instant;

c is the speed of light;

$f_b^s$ is the frequency of the signal corresponding to the satellite s and the frequency band b $dt_k(t)$ is the current clock bias of related to the antenna k;

$dt^s(t)$ is the current clock bias of the satellite s;

$I_{k,b}^s(t)$ is the ionospheric delay affecting the signal $\{s,b\}$ received by the antenna k. Thus $I_{k,L1}^s(t)$ is related to the L1 band. Basically, the ionospheric delay depends on the position of the antenna, position of the satellite, frequency of the signal, and the total electronic content (TEC) corresponding to the time instant t;

$T_k^s(t)$ is the tropospheric delay. In contrast to the ionospheric delay, it does not depend on the signal frequency and is called "non-dispersive" delay.

$P_{k,b}^s(t)$ and $\varphi_{k,b}^s(t)$ are pseudorange and phase measurements, respectively;

$M_{k,b,P}^s$ and $M_{k,b,\varphi}^s$ are code and phase multipath, affecting pseudorange and carrier phase measurements, respectively;

$N_{k,b}^s(t_{CS,k,b}^s)$ is carrier phase ambiguity corresponding to the signal $\{s,b\}$ received by the station k. Note that it corresponds to the last detected cycle slip, and therefore it explicitly dependents on the time instant $t_{CS,k,b}^s$, when the cycle slip was detected. The carrier phase ambiguity remains unchanged until the cycle slip occurs.

$\rho_k^s(t)$ is the true topocentric range between the satellite and the antenna. The measurement equations (2) and (3) relate this quantity with pseudorange and carrier phase observables, respectively;

Quantities $D_{b,\varphi}^s$, $D_{b,P}^s$, $\varepsilon_{k,b,P}^s(t)$ and $\varepsilon_{k,b,\varphi}^s$ denote hardware biases and noise. D stands for satellite-related bias, while d denotes the antenna-related bias. Biases reflect a systematic hardware component of the measurement error. Note that different antennas are connected to different receivers or different hardware channels of the same multi-antenna receiver. Due to their physical nature, biases are constant or slowly varying, in contrast to the noise component of the error having a stochastic nature. Satellite position error is part of the slow varying bias. It is also called "the ephemerides" error.

Thus, the antenna position is measured by the pseudorange and carrier phase observables for the plurality of satellites. Error components, including biases and noise, affecting the observable equations (2) and (3), prevent a direct solution for the receiver antenna position.

Carrier phase measurements are much more precise, compared to the pseudorange measurements, since the carrier phase noise has standard deviation in the centimeter or even millimeter range, while the standard deviation of the pseudorange measurements is usually of the meter or decimeter range. On the other hand, the carrier phase measurement is affected by the carrier phase ambiguity, which is an unknown integer valued quantity.

Thus, elimination of measurement errors is necessary for precise positioning. To achieve a high precision in position determination or relative across-antenna baseline determination, different methods of error mitigation are applied. For example, tropospheric errors can be precisely modeled and compensated in observables of equations (2) and (3). Ionospheric errors can be estimated along with other unknowns or eliminated by differencing. Noise is easily filtered.

Errors common to two antennas, like clock and hardware biases of the satellite, can be compensated in a difference between two receivers. Also, if two antennas are located sufficiently close to each other, then the ionospheric delay error can be assumed common to two antennas. In the GNSS processing theory the term "sufficiently close" means a kilometers range, therefore for attitude determination application when antennas are located on the same rigid body flying, floating, or running over Earth, the ionospheric error can be assumed common to all N antennas. The same goes for the "ephemerides" error.

The processing mode involving calculation of the across-receiver difference (also called the "first difference") is referred to as differential GNSS processing or DGNSS. The DGNSS processing is performed in real time and includes not only pseudoranges but also carrier phase observables, and is referred to as real time kinematic (RTK) or CPD processing. The CPD processing of difference between antenna k and antenna l allows for precise positioning of the antenna k relative to the antenna l. Relative position or the baseline vector starting at the antenna l and ending at the antenna k will be denoted by $d\,x_{k,l}(t)$. The symbol (t) implies an explicit dependence of a certain quantity on time. The ionospheric error and ephemerides error are assumed to be eliminated by across-receiver differences.

For two stations k and l the across-receiver differences of pseudorange and carrier phase measurements can be written as $$\overline{P}_{kl,b}^s(t) = \rho_k^s(t) - \rho_l^s(t) + cdt_{kl}(t) + d_{kl,b,P} + \overline{\varepsilon}_{kl,b,P}^s(t), \quad (4)$$

$$\overline{\varphi}_{kl,b}^s(t) = \frac{1}{\lambda_b^s}(\rho_k^s(t) - \rho_l^s(t)) + f_b^s dt_{kl}(t) + N_{kl,b}^s(t_{CS,kl,b}^s) + d_{kl,b,\varphi}^s + \overline{\varepsilon}_{kl,b,\varphi}^s. \quad (5)$$

The linearization is then used for precise calculation of the baseline vectors $d\,x_{k,l}(t)$ connecting antennas. The measurements related to the antenna k will be linearized at the approximate position of the antenna l. Approximate position is usually provided by standard standalone (or single antenna) positioning algorithm that uses only pseudorange (2) determined for the antenna $A_l$. The standalone position is usually accurate up to several meters due to uncompensated ionospheric and ephemeris error.

The general form of the linearized navigation model has the following form (see [1, Chapt. 7])

$$b_P(t) = Ad\,x(t) + e\xi(t) + d_P \quad (6)$$

$$b_\varphi(t) = \Lambda^{-1} Ad\,x(t) + \Lambda^{-1} e\xi(t) + n + d_\varphi \quad (7)$$

The carrier phase ambiguity is across-receiver differenced.

Let M be a total number of satellite signals, including different satellite systems, different satellites, different frequency bands. In the following description, all vectors are represented by columns, and the superscript symbol $^T$ denotes the matrix transpose. $R^M$ is the M-dimensional Euclidean space. Given a linearization point $x_{0,l}(t) \in R^3$ of the antenna $A_l$, notations used in equations (6) and (7) are as follows:

$b_P(t) \in R^M$ is the M-dimensional vector of pseudorange residuals calculated at the linearization point;

$b_\varphi(t) \in R^M$ is the M-dimensional vector of carrier phase residuals calculated at the linearization point;

$e=(1,1,\ldots,1)^T \in R^M$ is the vector consisting of all "ones";

$d\,x_{kl}(t) \in R^3$ is the correction to the linearization point. Thus, the precise position of the antenna $A_k$ with respect to the antenna $A_l$ is calculated as $x_k(t)=x_{0,l}(t)+d\,x_{kl}(t)$;

$\xi(t)$ is the arbitrary varying across-receiver differenced clock shift;

$\Lambda$ is the M-dimensional diagonal matrix with wavelengths $\lambda_b^s = c/f_b^s$ in the main diagonal. Each wavelength corresponds to the specific signal (s,b)

A is the M×3 matrix of directional cosines;

$n \in R^M$ is the vector of carrier phase ambiguities related to all signals;

$d_P \in R^n$ and $d_\varphi \in R^n$ are vectors of pseudorange and carrier phase receiver hardware biases.

Consideration of pseudorange hardware biases leads to a necessity to consider the plurality of signals the receiver is able to track. In the case of a multi-frequency and multi-system receiver supporting the following bands:

L1, L2 and L5 bands for GPS,
L1 and L2 GLONASS,
L1, E5a, E5b and E6 Galileo,
L1, L2, L5 and E6 QZSS,
L1 an, L5 SBAS,
B1, B2, and B3 Beidou, the signals (L1 GPS, L1 Galileo, L1 SBAS, L1 QZSS), (L2 GPS, L2 QZSS), (L5 GPS, E5a Galileo, L5 SBAS, L5 QZSS), (E6 Galileo, E6 QZSS), respectively, can share the same hardware channel and therefore will be affected by the same hardware bias, as noted in [1, Chapter 7]. Note that the biases vector $d_P$ and the clock shift variable $\xi(t)$ appear as a sum in equation (6). This means that one of the biases, say $d_{L_1,G/E/S/Q,P}$, can be combined with $\xi(t)$, while others can be replaced with their difference with $d_{L_1,G/E/S/Q,P}$. Thus, new bias variables appear:

$$\eta_1 = d_{L_2,G/Q,P} - d_{L_1,G/E/S/Q,P}, \eta_2 = d_{L_1,R,P} - d_{L_1,G/E/S/Q,P},$$
$$\eta_3 = d_{L_2,R,P} - d_{L_1,G/E/S/Q,P}\, \eta_4 = d_{L_5,G/E/S/Q,P} - d_{L_1,G/E/S/Q,P},$$
$$\eta_5 = d_{E_{5b},E,P} - d_{L_1,G/E/S/Q,P}, \eta_6 = d_{E_6,E/Q,P} - d_{L_1,G/E/S/Q,P}\, \eta_7 = d_{B_1,B,P} - d_{L_1,G/E/S/Q,P}, \eta_8 = d_{B_2,B,P} - d_{L_1,G/E/S/Q,P}, \eta_9 = d_{B_3,B,P} - d_{L_1,G/E/S/Q,P} \quad (8)$$

This representation can be referred to as establishing a bias datum.

In one possible embodiment, the linearized equations (6) can now be expressed in the form $$b_P(t) = Ad\,x(t) + e\xi(t) + W_\eta \eta \quad (9)$$

The bias vector $\eta$ has the appropriate dimension $m_\eta$. Note again that in this exemplary embodiment we follow notations introduced in [1], which is incorporated herein by reference in its entirety.

The bias vector $\eta$ is three-dimensional ($m_\eta=3$) for dual-band and dual-system GPS/GLONASS receivers, as only biases $\eta_1, \eta_2, \eta_3$ are presented among all possible biases listed in (8). In the case of the multi-band, multi-system receiver, the dimension of the vector $\eta$ can be large. It is one-dimensional in the case of dual-band GPS-only receivers or single band GPS/GLONASS receivers.

The $W_\eta$ is referred to as bias allocation matrix and has dimensions $M \times m_\eta$. It allocates a single bias, or none, to a certain signal. No bias is allocated to the signal corresponding to the GPS, Galileo, SBAS, or QZSS systems and b=L1 because we combined the bias $d_{L_1,G/E/S/Q,P}$ with the clock bias $\xi(t)$. In this case, the row of $W_\eta$ consists of zeroes.

Consider, for example, a dual-band GPS/GLONASS receiver. Suppose it tracks six GPS satellites and six GLO-NASS satellites. The total number of dual-band signals is 24. Let the signals be ordered in the following way: six GPS L1, six GPS L2, six GLONASS L1, and six GLONASS L2 signals. The biases allocation matrix presented in the linearized single difference pseudorange equation (9) takes the following form:

$$W_\eta^T = \begin{bmatrix} 0 & 0 & 0 & 1 & 1 & 1 & 0 & 0 & 0 & 0 & 0 & 0 \\ 0 & 0 & \vdots & 0 & 0 & 0 & \vdots & 0 & 1 & 1 & 1 & \vdots & 1 & 0 & 0 & \vdots & 0 \\ 0 & 0 & 0 & 0 & 0 & 0 & 0 & 0 & 0 & 1 & 1 & 1 \end{bmatrix} \quad (10)$$

Further, the real-valued carrier phase ambiguities (also called "float ambiguities") are combined with biases $d_\varphi$, while pseudorange biases are considered as a real valued constant unknown parameter. Thus, after combination of carrier phase ambiguities with carrier phase biases, the equation (7) takes the form $$b_\varphi(t) = \Lambda^{-1} Ad\,x(t) + \Lambda^{-1} e\xi(t) + n \quad (11)$$

Note that the noise component is omitted in equations (9), (11) for the sake of brevity.

Combined processing of the linearized observables equations (9) and (11) collected for several successive time instances t (called epochs) allows for filtering out noise and accurate determination of the integer-valued ambiguity vectors $n^*$. Once it is fixed as the integer vector, it is taken to the left side in (11) forming precise unbiased carrier phase measurements $b^*_\varphi(t) = b_\varphi(t) - n$. Rewriting now carrier phase equations to explicitly denote dependence on the pair (k,l) of antennas gives $$b^*_{\varphi,kl}(t) = \Lambda^{-1} Ad\,x_{kl}(t) + \Lambda^{-1} e\xi_{kl}(t) \quad (12)$$

With the spanning tree determined above and consisting of (N−1) edges (vectors) $d\,x_{kl}$ one can solve the equation (12) with respect to $d\,x_{kl}$ in the sense of least squares. Let define the matrix $J = \Lambda^{-1}A$ and vector $E = \Lambda^{-1}e$. The least squares fit problem takes the form $$\|Jdx_{kl}(t) + \xi_{kl}(t)E - b_{kl}(t)\|_W^2 \to \min_{d\,x_{kl},\xi_{kl}} \quad (13)$$

where the symbol $\|\,\|_w$ stands for the weighted Euclidean norm, W is the weighting matrix, reflecting quality of measurements. The problem (13) can further be equivalently rewritten as $$\min_{d\,x_{kl}} \left( \min_{\xi_{kl}} \|Jd\,x_{kl}(t) + \xi_{kl}(t)E - b_{kl}(t)\|_W^2 \right) \quad (14)$$

The symbol (t) will be omitted for brevity. Taking the internal minimum in (14) one can rewrite it as $$\min_{d\,x_{kl}} (\bar{J}d\,x_{kl} - \bar{b}_{kl})^T W (\bar{J}d\,x_{kl} - \bar{b}_{kl}) \quad (15)$$

where $\bar{J}$ and $\bar{b}_{kl}$ are matrices defined as $$\bar{J} = \left(I - \frac{1}{E^T E} EE^T\right) J, \bar{b}_{kl} = \left(I - \frac{1}{E^T E} EE^T\right) b_{kl}.$$

The problem (15) has solution $$d\,x_{kl} = (JWJ^T)^{-1}J^T W b_{kl} \quad (16)$$

or, for the case of identity weighting matrix $$d\,x_{kl} = (JJ^T)^{-1}J^T b_{kl} \quad (17)$$

The 3×(N−1) matrix composed of all d $x_{kl}$ will be denoted by X.

Now attitude calculations can be performed. The same vectors of the spanning tree expressed in the body frame are denoted by d $x_{kl}^o$. They can be accurately determined by measurements tools like laser rulers or others. They can be also determined though GNSS RTK processing when the body is oriented in such a way that the Nose axis points to the North and to plane spanned on Right and Nose axes that coincides with the local horizon which approximately can be considered as "flat" orientation on the ground. The 3×(N−1) matrix composed of all d $x_{kl}^o$ will be denoted by $X^o$. The orientation matrix Q of the body frame relative to ECEF can be determined as the best fit of the relation $$X = QX^o \quad (18)$$

Using notation $$\|R\|_F^2 = \sum_{i=1}^{m}\sum_{j}^{n} r_{ij}^2$$

for the square of the Frobenius norm of the m×n matrix and tr(•) standing for trace of the matrix, we can write $\|R\|_F^2 = \text{tr}(R^T R) = \text{tr}(RR^T)$. Then the best fit for (18) in terms of the Frobenius norm can be written as $$\min_{Q^T Q = I} tr(QX^o - X)^T(QX^o - X) \quad (19)$$

or, equivalently, as it is shown in [1]

$$\max_{Q^T Q = I} tr(X^T Q X^o) \quad (20)$$

which can be efficiently solved via SVD (singular value decomposition) as shown in [1]. The matrix $X^o X^T$ is SVD-factorized as $X^o X^T = V\Sigma U$ and finally $Q = U^T V^T$ where U and V are 3×3 orthogonal matrices, Σ is a diagonal matrix of singular values.

In this standard approach all base line vectors d $x_{kl}$ are determined separately, vector by vector solving the problem (15) for each edge (k,l) of the spanning tree and having the answer (16) or (17). Then all vectors are combined in the 3×(N−1) matrix X.

When processing all vectors independently, one can't use the following advantages, that can be used for combined processing:

A) known lengths of vectors
B) known angles between vectors (known inner products between them)
C) better redundancy of the carrier phase measurements when looking for anomalous measurements.

The proposed approach combines processing all vectors simultaneously so that advantages A), B), C) can be used. As follows from detailed description of invention, simultaneous processing of all measurements with the baselines geometry taken into account leads to numerically hard problem for which SVD approach cannot be used. Therefore, there is a need for new numerically tractable algorithm that can find attitude efficiently.

SUMMARY OF THE INVENTION

Accordingly, the present invention is directed to numerically efficient calculation of the attitude determination problem using Semi-Definite Programming (SDP) relaxation applied to the calculations by converting the problem to a convex optimization form, for which efficient numerical algorithms are available.

In one aspect, there is provided a method for determining attitude of an object having multiple GNSS antennas, the method including receiving GNSS signals from at least five satellites, wherein at least two of the five belong to a different satellite constellation (e.g., Galileo) than the other satellites (e.g., GPS); processing each of the GNSS signals to generate pseudorange code and carrier phase measurements; resolving carrier phase ambiguities for all the received GNSS signals; generating unbiased carrier phase measurements based on the resolving; determining the attitude, including heading, pitch, and roll angles $\psi, \theta, \phi$, respectively, by solving a quadratically constrained quadratic minimization problem through finding a minimum of a linear function subject to a linear matrix inequality constraint; and outputting the attitude.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 2:
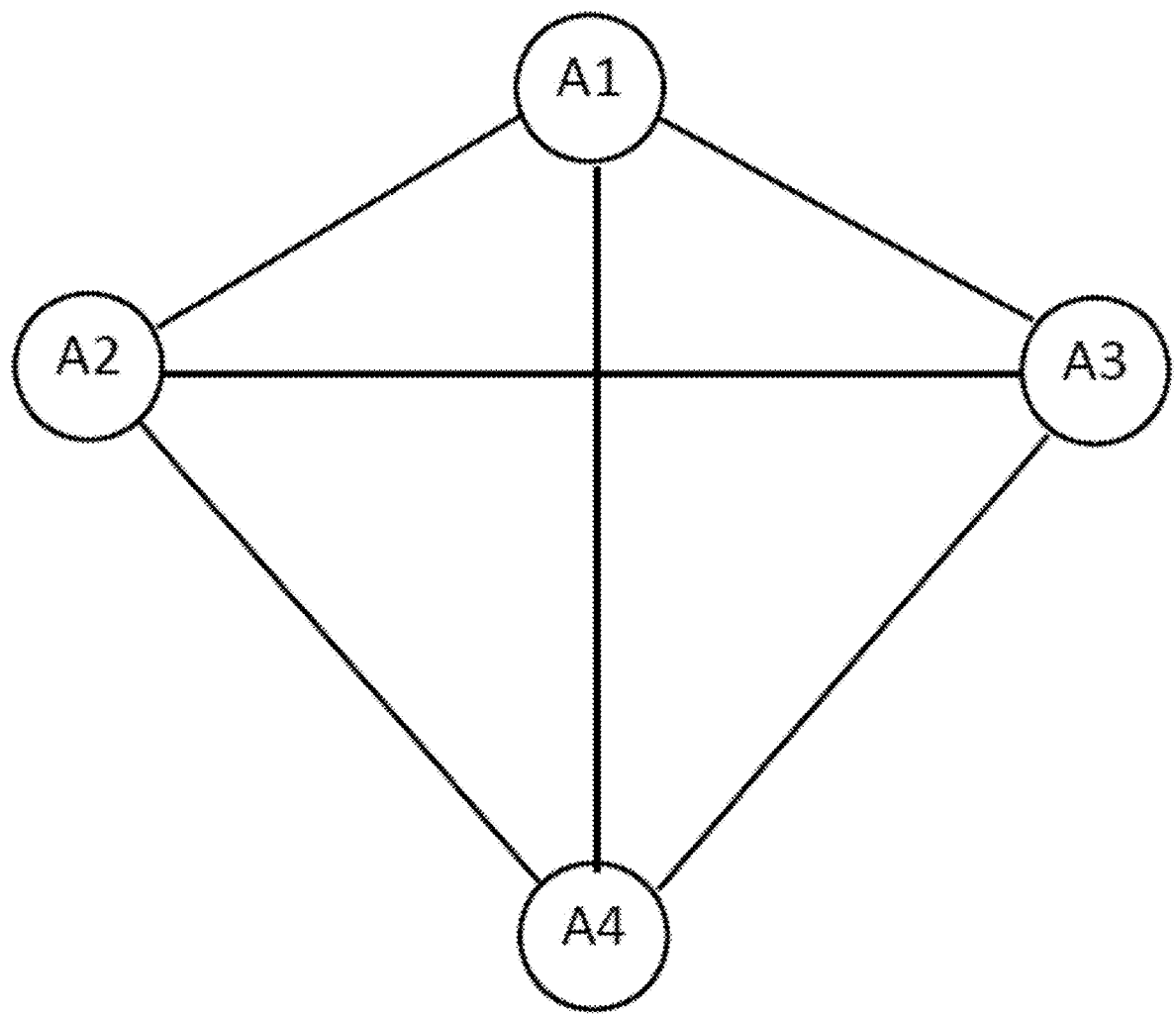
Figure 4:
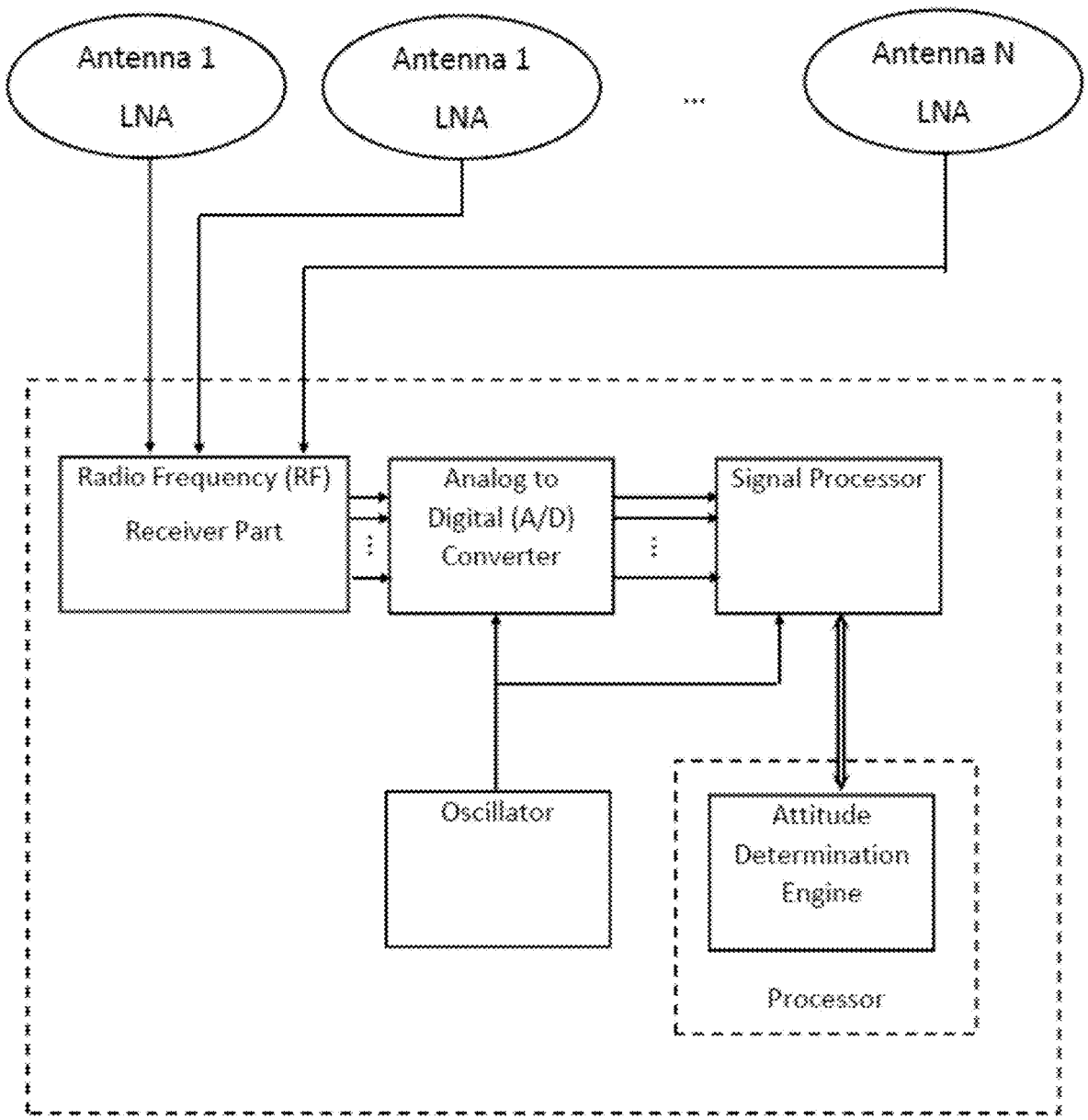

In the drawings:

FIG. 1 illustrates different reference coordinate frames.
FIG. 2 illustrates full antenna location graph.
FIG. 3 illustrates examples of different spanning trees.
FIG. 4 shows a structure of an exemplary multi-antenna navigation receiver.

DETAILED DESCRIPTION OF EMBODIMENTS OF THE INVENTION

Reference will now be made in detail to the embodiments of the present invention.

With the spanning tree determined above and consisting of (N−1) edges (unknown vectors) d $x_{kl}$, let us combine all vectors $b^*_{\varphi,kl}(t)$ to the M×(N−1) matrix B (the notation (t) is omitted for brevity). All (N−1) vectors can be similarly combined into the 3×(N−1) matrix (unknown) X, all values $\xi_{kl}(t)$ can be combined into the 1×(N−1) row Ξ. Let also define the matrix $J = \Lambda^{-1} A$ and vector $E = \Lambda^{-1} e$. Then collection of (N−1) equations (12) can be rewritten as the matrix equation where all dimensions match according to definitions determined in this paragraph:

$$B = JX + E\Xi \tag{21}$$

Substitution of the relationship $X=QX^0$ into the equation (21) and applying the least squares method leads to the following formulation:

$$\|JQX_0 + E\Xi - B\|_F^2 \to \min_{Q,\Xi} \tag{22}$$

over all matrices subject to $Q^TQ=I$ and real valued $\Xi$, where I stands for the identity matrix of the appropriate dimension.

The minimization problem (22) can now be rewritten as $$\min_{Q^TQ=I} \left( \min_{\Xi} \|JQX^0 + E\Xi - B\|_F^2 \right) \tag{23}$$

Taking the internal minimum in (23) and using the trace notation for the Frobenius norm, (23) can be rewritten as $$\min_{Q^TQ=I} tr(JQX^0 - \overline{B})^T(JQX^0 - \overline{B}) \tag{24}$$

where $\overline{J}$ and $\overline{B}$ are matrices defined as $$\overline{J} = \left(I - \frac{1}{E^TE}EE^T\right)J, \overline{B} = \left(I - \frac{1}{E^TE}EE^T\right)B.$$

Usually optimal processing assumes weighting of measurements. The maximum likelihood method uses an inverse variance-covariance matrix for weighting: $W=C^{-1}$. Knowledge of the variance-covariance matrix is assumed because we know the physical nature of errors. Therefore, the problem of equation (24) takes the form $$\min_{Q^TQ=I} tr(\overline{J}QX^0 - \overline{B})^T W(\overline{J}QX^0 - \overline{B}) \tag{25}$$

with appropriate weighting matrix dimension.

Using properties of the matrix trace, (24) can be rewritten as $$\min_{Q^TQ=I} \left[ trX^{0T}Q^T\overline{J}^T W\overline{J}QX^0 - 2tr\overline{B}^T W\overline{J}QX^0 \right] \tag{26}$$

The problem with solving expression (26) subject to minimization, is that it is a nonlinear programming problem, since it assumes a minimization of the scalar nonlinear function (the expression in the square brackets) of 9 variables (entries of the matrix Q) over 6 nonlinear quadratic constraints (diagonal and upper diagonal entries of the matrix $Q^TQ$). Generally, these problems are hard to solve reliably and in a predictable time. In many practical applications (such as a small aircraft performing surveying), expression (26) has to be solved many times per second (sometimes several hundred times per second). This is computationally impractical.

Summing up, in the general case, the expression (26) is hard to solve because of quadratic dependence of the cost function on the matrix Q and the quadratic constraints.

The problem (26) is formulated after the optimal spanning tree has been selected among all possible spanning trees in the full antenna graph. The natural way to optimize selection is to look for such a tree that provides minimum value of the condition number of the matrix $X^0X^{0T}$. The smaller the condition number, the better the entire problem (26) is numerically conditioned. Large values mean ill-conditioning. Small values mean well-conditioning.

The problem (26) can be simplified if we chose another, not optimal weighting matrix in such a way that $\overline{J}^T W\overline{J}=I$ (for example $W=\overline{J}(\overline{J}\overline{J}^T)^{-2}\overline{J}^T=\overline{J}^{+T}\overline{J}^+$, $\overline{J}^+$ is pseudoinverse). Then the problem (26) takes the form $$\max_{Q^TQ=I} tr\overline{B}^T W\overline{J}QX^0 = \max_{Q^T=Q=I} tr\tilde{X}^T QX^0, \tag{27}$$

$$\tilde{X}^T = \overline{B}^T W\overline{J}$$

which is similar to (20) and can be efficiently solved via SVD as shown above. Therefore, the methods proposed in [1] (and commonly used conventionally) can be derived from (26) with an artificial and non-optimal choice of the weighting matrix. Phrased another way—in the conventional approach of [1], a computationally efficient solution of (27) for matrix Q uses a non-optimal matrix W. The desired solution is therefore a solution of (26), rather than a solution of (27). To do this, the SDP relaxation approach is used, to make the solution of (26) tractable.

Non-convexity of the optimization problem (26) makes it very inefficient for computationally efficient solution. To make the problem numerically tractable we use semi-definite programming (an SDP approach to relax non-convex constraints) and the cost function replacing them by their convex analogs.

The convex problem allows for a numerical solution with polynomial computational complexity (see [4]). The SDP relaxation applied to the problem of solving equation (26) for attitude determination using GNSS signals and the algorithm for solution of the attitude determination problem is therefore a novel step of the present invention.

After the matrix Q is determined, it allows for calculation of orientation of the body frame with respect to ECEF. To translate it to the orientation of the body frame relative to the local horizon it must be multiplied by appropriate rotation matrix, rotating the reference frame from ECEF to the local horizon, see for example [3]. After that the three attitude/orientation angles $\psi,\theta,\phi$ (which are the quantities that are ultimately of interest in this exercise) can be determined according to (1).

The expression subject to minimization in (26) can be equivalently transformed using concept of inner product of matrices. Let $R_1$ and $R_2$ be square matrices of the same size. Define the inner product of them as $$\langle R_1, R_2 \rangle = trR_1R_2 \tag{28}$$

so that $\langle R,R \rangle = \|R\|_F^2$. Let us denote $$G = \begin{pmatrix} \overline{J}^T W\overline{J} & -\overline{J}^T W\overline{B} \\ -\overline{B}^T W\overline{J} & 0 \end{pmatrix} \tag{29}$$

and keeping in mind the relation $X=QX^0$ to denote $$Z = \begin{pmatrix} Y & X \\ X^T & I \end{pmatrix} \quad (30)$$

where $Y=XX^T$.

Then the problem (26) is equivalent to the following problem $$\langle G,Z \rangle \to \min \quad (31)$$

subject to constraints $$Y - QX^0 X^{0T} Q^T = 0, \quad (32)$$

$$Z = \begin{pmatrix} Y & QX^0 \\ X^{0T}Q^T & I \end{pmatrix}, \quad (33)$$

$$Q^T Q - I = 0, \quad (34)$$

Conditions (32) and (34) are non-convex. Substituting for them less constraining semi-definite inequality constraints $$Y - QX^0 X^{0T} Q^T \succeq 0 \quad (35)$$

and $$Q^T Q - I \succeq 0 \quad (36)$$

means semidefinite relaxation. Here the symbol $\succeq$ means positive semi-definiteness of matrices. Condition (35) is equivalent (due to the so called "Schur Lemma", see [4]) to the condition $$Z \succeq 0. \quad (37)$$

Condition (36) is equivalent to $$\begin{pmatrix} I & Q \\ Q^T & I \end{pmatrix} \succeq 0 \quad (38)$$

Note that the cost function subject to minimization in (31) is linearly dependent on 9 entries of the matrix Q due to the equation (33). Left sides of matrix inequalities (37) and (38) are also linearly dependent on entries of Q. These inequalities are known as linear matrix inequalities (LMI) and establish convex constraints on Q. Thus, the attitude determination problem is reduced to the convex optimization problem for which there are very efficient numerical algorithms, see [4].

Possible algorithms include:
Ellipsoid method, and
Path-following method for -log det(.) barrier functions.

These and other similar algorithms are known in the art, and many of them are readily available in Linux.

Numerical experiments performed by the inventor shows that in practice relaxed and initial problems in many examples give the same result. Therefore, in practice, relaxation does not necessarily lead to a need to improve the result applying additional orthogonalization of the matrix If the number of antennas is 3 then N−1=2 and number of columns in the matrix $X_0$ is 2. In this case (and only in this case) the number of columns must be increased by adding third column as an outer product (vector product) of first two columns $$d\, x_3^0 = d\, x_1^0 \times d\, x_2^0 \quad (39)$$

The choice of the spanning tree in the full graphs (FIG. 2) should be performed in such a way that the condition number of the matrix $X^{0T}X^0$ is minimized. This problem is solved only once, not in real time and therefore its computational impact is not a limiting factor.

The structure of the multi-antenna navigation receiver is shown in FIG. 4. Multiple antennas are connected to the multi-antenna receiver consisting among others of multi-channel radio frequency (RF) part. RF signals are convolved with reference signals generated by the numerically controlled oscillator and digitized by A/D converter. Result of convolution is used for multiple signal tracking. Multiple signals corresponding to plurality of satellites, multiple frequency bands, and multiple antennas are used for attitude calculations as described in the patent. The processor runs signal tracking, positioning, and attitude determination algorithms.

Having thus described the different embodiments of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

REFERENCES (ALL OF WHICH ARE
INCORPORATED HEREIN BY REFERENCE IN
THEIR ENTIRETY)

1. C. E. Cohen, "*Attitude Determination*", Global Positioning System: Theory and Applications, Volume 2, edited by B. W. Parkinson and J. J. Spilker, Vol. 164, Progress in Astronautics and Aeronautics, AIAA, Reston, Va., 1994.
2. C. Berge, *The Theory of Graphs,* Courier Corp., 1962.
3. A. Leick, L. Rapoport, D. Tatarnikov, *GPS Satellite Surveying,* Wiley & Sons, 2015
4. Ben-Tal, A., Nemirovski, A., *Lectures on Modern Convex Optimization: Analysis, Algorithms, and Engineering Applications,* MOS-SIAM Series on Optimization, 2001.

What is claimed is:

1. A method for determining attitude of an object having multiple GNSS antennas, the method comprising:
   receiving GNSS signals from at least five satellites, wherein at least two of the five belong to a different satellite constellation than the other satellites;
   processing each of the GNSS signals to generate pseudorange code and carrier phase measurements;
   resolving carrier phase ambiguities for all the received GNSS signals;
   generating unbiased carrier phase measurements based on the resolving;
   determining the attitude, including heading, pitch, and roll angles $\psi, \theta, \phi$ respectively, by solving a quadratically constrained quadratic minimization problem through finding a minimum of a linear function subject to a linear matrix inequality constraint; and
   outputting the attitude.

2. The method of claim 1, wherein the finding of the minimum uses Semi-Definite Programming.

3. The method of claim 1, wherein the quadratically constrained quadratic minimization problem solves for the matrix Q in $$\min_{Q^T Q = I} \left[ tr X^{0T} Q^T \bar{J}^T W \bar{J} Q X^0 - 2tr \bar{B}^T W \bar{J} Q X^0 \right]$$

where
Q is an orthogonal matrix $$Q = \begin{pmatrix} \cos(\psi)\cos(\theta) & \cos(\psi)\sin(\phi)\sin(\theta) - \cos(\phi)\sin(\psi) & \sin(\phi)\sin(\psi) + \cos(\phi)\cos(\psi)\sin(\theta) \\ \cos(\theta)\sin(\psi) & \cos(\phi)\cos(\psi) + \sin(\phi)\sin(\psi)\sin(\theta) & \cos(\phi)\sin(\psi)\sin(\theta) - \cos(\psi)\sin(\phi) \\ -\sin(\theta) & \cos(\theta)\sin(\phi) & \cos(\phi)\cos(\theta) \end{pmatrix},$$

W is a weighting matrix,
$\bar{B}$ is a matrix of unbiased carrier phase across-antenna differenced measurements collected for all baselines and all signals,
$\bar{J}$ is a matrix of directional cosines corresponding to all signals, and
$X^0$ is a matrix of all the baselines expressed in a body frame of the object.

4. The method of claim 3, wherein the matrix W is a diagonal weighting matrix representing an inverse of variance for each satellite.

5. The method of claim 3, wherein the attitude determination uses baselines defined by vector distances between the antennas, and wherein the baselines are selected using a spanning tree to minimize a condition number of the matrix $X^O X^{OT}$.

6. The method of claim 3, wherein the matrix Q must satisfy LMI (linear matrix inequality) of $$Z \succeq 0,$$
$$\begin{pmatrix} I & Q \\ Q^T & I \end{pmatrix} \succeq 0,$$

where $$Z = \begin{pmatrix} Y & QX^0 \\ X^{0T}Q^T & I \end{pmatrix}$$

is a matrix linearly dependent on the matrix Q
Y is auxiliary symmetric 3×3 matrix, and
I is a 3×3 identity matrix.

7. A system for determining attitude of an object, the system comprising:
a plurality of antennas receiving GNSS signals from at least five satellites, wherein at least two of the five belong to a different satellite constellation than the other satellites;
a signal processor processing each of the GNSS signals to generate pseudorange code and carrier phase measurements;
wherein the signal processor resolves carrier phase ambiguities for all the carrier phase measurements and generates unbiased carrier phase measurements based on the resolving;
an attitude determination block determining and outputting the attitude, including heading, pitch, and roll angles ψ,θ, φ, respectively, by applying Semi-Definite Programming to the unbiased carrier phase measurements.

8. The system of claim 7, wherein the determining of the heading, pitch, and roll angles ψ,θ,φ solves a quadratically constrained quadratic minimization problem through finding a minimum of a linear function ⟨G,Z⟩, subject to a linear matrix inequality constraint where $$G = \begin{pmatrix} \bar{J}^T W \bar{J} & -\bar{J}^T W \bar{B} \\ -\bar{B}^T W \bar{J} & 0 \end{pmatrix},$$

Q is an orthogonal matrix $$Q = \begin{pmatrix} \cos(\psi)\cos(\theta) & \cos(\psi)\sin(\phi)\sin(\theta) - \cos(\phi)\sin(\psi) & \sin(\phi)\sin(\psi) + \cos(\phi)\cos(\psi)\sin(\theta) \\ \cos(\theta)\sin(\psi) & \cos(\phi)\cos(\psi) + \sin(\phi)\sin(\psi)\sin(\theta) & \cos(\phi)\sin(\psi)\sin(\theta) - \cos(\psi)\sin(\phi) \\ -\sin(\theta) & \cos(\theta)\sin(\phi) & \cos(\phi)\cos(\theta) \end{pmatrix},$$

W is a weighting matrix,
$\bar{B}$ is a matrix of unbiased carrier phase across-antenna differenced measurements collected for all baselines and all signals,
$\bar{J}$ is a matrix of directional cosines corresponding to all signals, and
$X^0$ is a matrix of all the baselines expressed in a body frame of the object.
where $$Z = \begin{pmatrix} Y & QX^0 \\ X^{0T}Q^T & I \end{pmatrix}$$

is a matrix linearly dependent on the matrix Q,
Y is auxiliary symmetric 3×3 matrix, and
I is a 3×3 identity matrix.

9. The system of claim 8, wherein the matrix W is a diagonal weight matrix representing an inverse of variance for each satellite.

10. The system of claim 8, wherein the attitude determination uses baselines defined by vector distances between the antennas, and wherein the baselines are selected using a spanning tree to minimize a condition number of a matrix formed by $X^O X^{OT}$.

11. The system of claim 8, wherein the matrix Q satisfies LMI (linear matrix inequality) of $$Z \succeq 0,$$
$$\begin{pmatrix} I & Q \\ Q^T & I \end{pmatrix} \succeq 0,$$

where $$Z = \begin{pmatrix} Y & QX^0 \\ X^{0T}Q^T & I \end{pmatrix}$$

is a matrix linearly dependent on the matrix Q,
Y is auxiliary symmetric 3×3 matrix, and
I is a 3×3 identity matrix.

* * * * *

UNITED STATES PATENT AND TRADEMARK OFFICE
CERTIFICATE OF CORRECTION

| | | |
|---|---|---|
| PATENT NO. | : 10,935,669 B2 | Page 1 of 1 |
| APPLICATION NO. | : 16/088581 | |
| DATED | : March 2, 2021 | |
| INVENTOR(S) | : Lev Borisovich Rapoport | |

It is certified that error appears in the above-identified patent and that said Letters Patent is hereby corrected as shown below:

On the Title Page

Item (54), replace the title with:
Attitude Determination with Multiple Antennas Using Semi-Definite Programming Relaxation.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*